United States Patent [19]

Naves et al.

[11] 4,119,042
[45] Oct. 10, 1978

[54] RAILWAY CAR COUNTERBALANCED TILTING DECK

[75] Inventors: David G. Naves, Calumet City, Ill.; Herman A. Aquino, Hobart; Robert J. Mish, Merrillville, both of Ind.

[73] Assignee: Pullman Incorporated, Chicago, Ill.

[21] Appl. No.: 772,200

[22] Filed: Feb. 25, 1977

[51] Int. Cl.² .......................... B60P 3/08; B61D 3/04; B61D 3/16; F16F 1/06
[52] U.S. Cl. ................................. 105/368 R; 105/370; 211/13; 267/72; 292/213; 292/219; 296/1 A
[58] Field of Search ............. 105/368 R, 370; 211/13; 267/69, 71, 72; 292/2, 128, 219, 213; 296/1 A

[56] References Cited

U.S. PATENT DOCUMENTS

| 2,385,115 | 9/1945 | Stuart | 296/1 A |
|---|---|---|---|
| 2,568,149 | 9/1951 | Grabe | 267/71 X |
| 3,119,350 | 1/1964 | Bellingher | 105/368 R |
| 3,205,836 | 9/1965 | Wojcikowski | 105/368 R |
| 3,405,661 | 10/1968 | Erickson et al. | 105/368 R X |
| 3,426,704 | 2/1969 | Blunden | 105/370 X |
| 3,690,717 | 9/1972 | Taylor | 296/1 A |
| 3,836,133 | 9/1974 | Pyka et al. | 267/69 |
| 3,913,496 | 10/1975 | Lohr | 296/1 A X |
| 3,927,621 | 12/1975 | Skeltis et al. | 105/368 R |
| 3,938,446 | 2/1976 | Seitz et al. | 105/368 R |

Primary Examiner—Albert J. Makay
Assistant Examiner—Howard Beltran
Attorney, Agent, or Firm—Richard J. Myers

[57] ABSTRACT

A vehicle carrying railway car comprises a plurality of vertically spaced decks, at least one of which consists of a rigid central section and at opposite ends hinged deck sections that are adapted to be raised for facilitating the loading of vehicles onto the car. The raised deck sections are counterbalanced by a biasing assembly and may be locked in raised or lowered positions.

10 Claims, 9 Drawing Figures

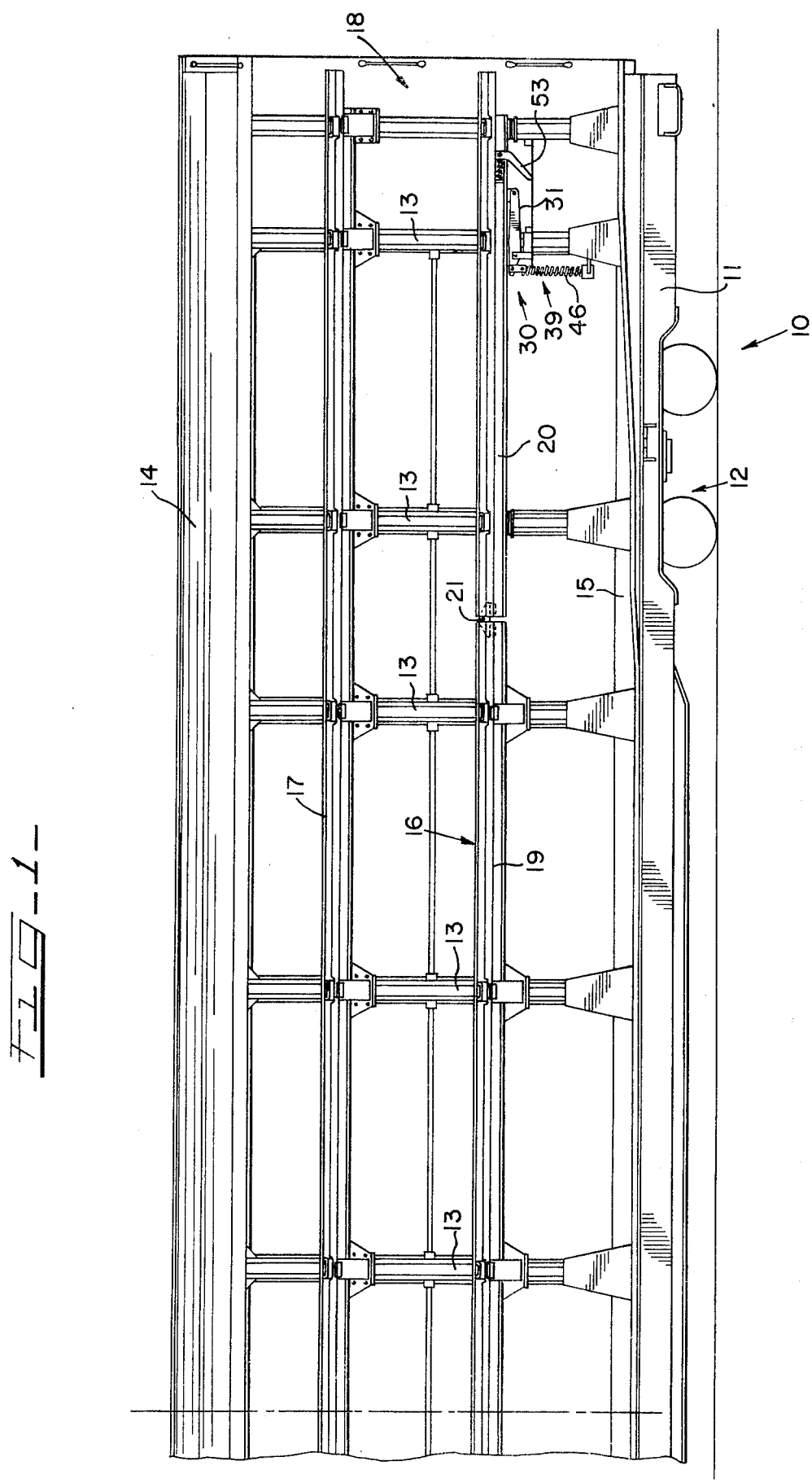

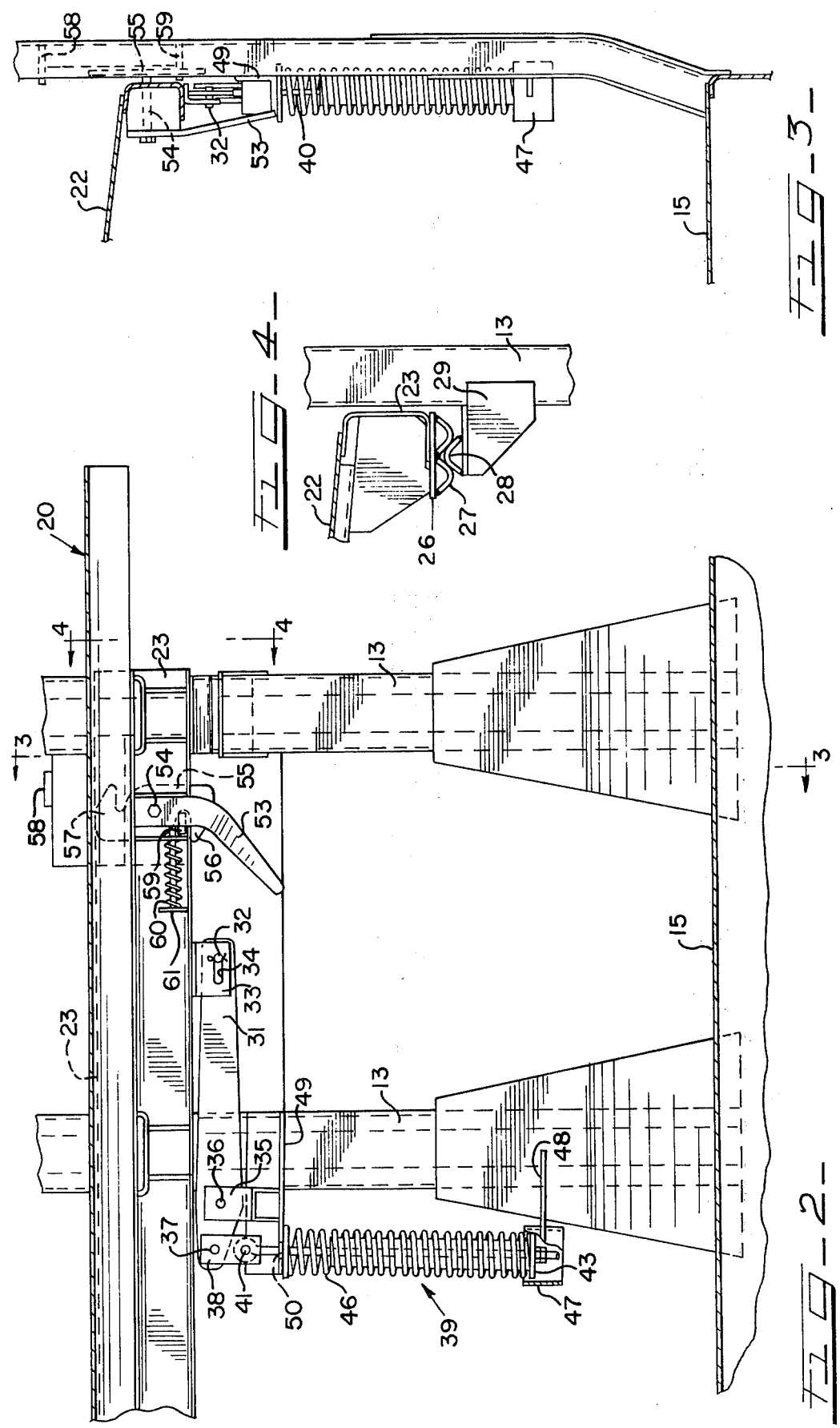

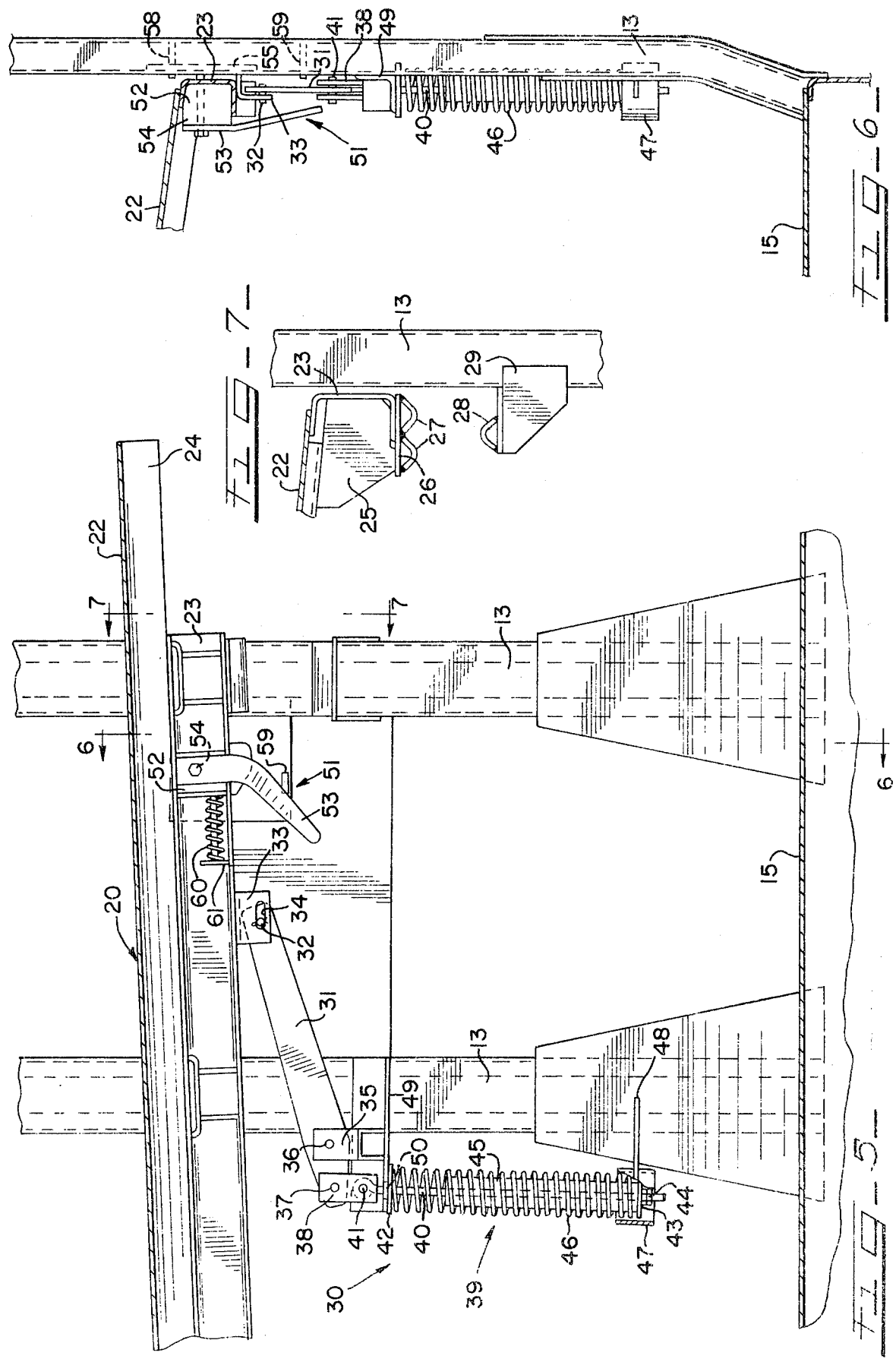

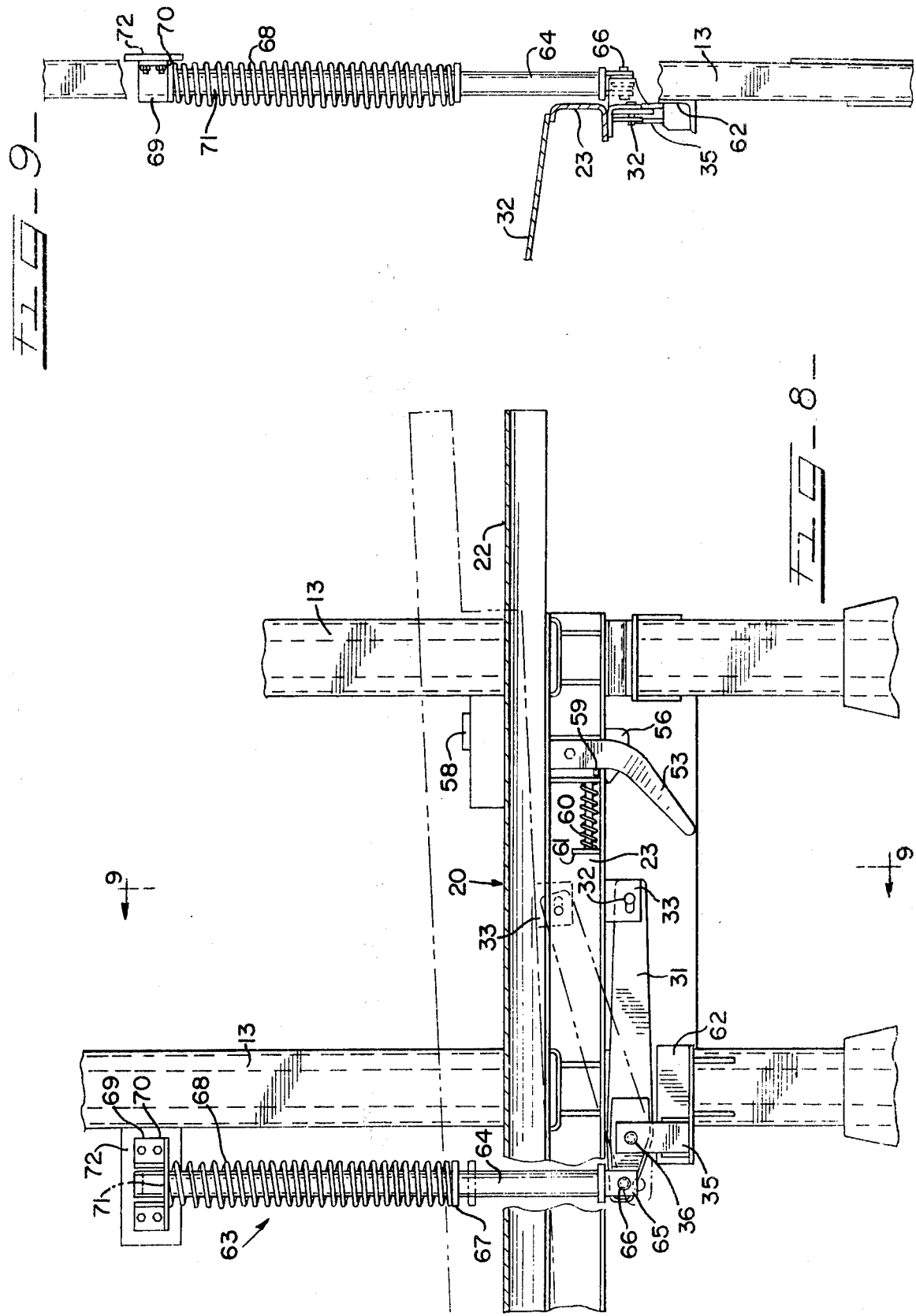

– 1 –

RAILWAY CAR COUNTERBALANCED TILTING DECK

BACKGROUND OF THE INVENTION

1. Field of the Invention

The invention broadly relates to the railway car art but more specifically pertains to a rack and decking arrangement for transporting automobiles and other vehicles on the car.

2. Description of the Prior Art

The prior art is disclosed in U.S. Pat. Nos. 3,119,350 Jan. 28, 1964; 3,405,661 Oct. 15, 1968; 3,205,836 Sept. 14, 1965; 3,913,496 Oct. 21, 1975; 3,927,621 Dec. 23, 1975; and 3,938,446 Feb. 17, 1976. The present invention is an improved railway car and rack arrangement for carrying vehicles and the like.

SUMMARY OF THE INVENTION

In the present invention a railway car is provided with a rack and platform assembly comprising a plurality of vertical posts longitudinally spaced along the railway car on opposite sides thereof. The posts support a plurality of vertically spaced platforms, each of which is adapted to support vehicles driven onto the railway car. The first deck positioned above the floor of the railway car comprises a rigid deck section extending substantially from the central portion of the car longitudinally outwardly wherein it terminates short of the ends of the car. A hinged deck is connected to opposite ends of the central or rigid deck section and are hingedly moved upwardly during loading to facilitate the operation thereof. The hinged deck may be moved upwardly and downwardly by the operator and is counterbalanced so that ease of movement by the operator is facilitated. Each hinged deck includes a counterbalancing mechanism which is spring activated by connection to a hinged lever in turn hingedly connected to the ends of the hinged deck for exerting a continually biasing force in an upward direction. The arrangement further includes a lock arrangement which will retain the hinged deck in its lowered position or in raised position as desired.

BRIEF DESCRIPTION OF THE DRAWINGS

FIG. 1 is a side elevational view of approximately one half of a railway car which is symmetrical;

FIG. 2 is an enlarged cross-sectional view partially in an elevation disclosing a counterbalancing and locking mechanism positioned on opposite sides of the railway car;

FIG. 3 is the cross-section view taken substantially along the line 3—3 of FIG. 2;

FIG. 4 is a cross-sectional view taken substantially along the line 4—4 of FIG. 2;

FIG. 5 is a view similar to FIG. 2 disclosing another operating position of a counterbalancing mechanism;

FIG. 6 is a cross-sectional view taken substantially along the line 6—6 of FIG. 5;

FIG. 7 is a cross-sectional view taken substantially along the line 7—7 of FIG. 5;

FIG. 8 is a view similar to FIGS. 2 and 5 showing a modified version of the invention;

FIG. 9 is a cross-sectional view taken substantially along the line 9—9 of FIG. 8.

DESCRIPTION OF THE PREFERRED EMBODIMENT

A railway car 10 particularly adapted for carrying automobiles and the like includes an underframe 11 supported on conventional wheel trucks 12. The railway car 10 has a rack structure supported thereon comprising a plurality of upright posts 13 which are spaced longitudinally along said car on laterally opposite side thereof. The upright posts support a roof structure 14 and the car includes a lower deck or floor 15. The rack is of multiple support construction including a first upper deck 16 and a second upper deck 17. The car is open at opposite ends and may be loaded by driving vehicles onto the floor and decks of the car. The open ends of the car are designated at 18. It is of course obvious that the rack if desired, may be suitably covered by protective paneling as well as the ends may be closed for security and protective purposes.

The first upper deck 16 comprises a first rigid deck section 19 suitably supported on an upright post 13. A hinged second deck 20 is connected to each of the ends of the rigid deck section 19 and is hingedly moveable with respect thereto by hinge brackets 21 laterally spaced along the contiguous edges of the sections 19 and 20. Each of the deck sections 19 and 20 also comprises a platform 20 onto which automobiles are driven. The platform 22 is suitably supported on opposite sides thereof by means of longitudinally extending channels 23 and longitudinal stringers 24 extending longitudinally may be suitably connected underneath the side of the platform 22 for reinforcing the same. The structure of the decks is substantially conventionally and need not be further described. The ends of the hinged platform 22 are supported on the posts 13 so that the hinged deck in its down position is in substantially linear relation with respect to the rigid deck 19. Reinforcing gussets 25 are suitably connected to the channels 23 longitudinally spaced along the channel 23 reinforce the same in connection with the platform 22. A plate 26 is connected to the forward ends of the hinged sections and includes a plurality of downwardly extending V-shaped feet 27 providing a socket for engaging and seating upon an inverted v-shaped element 28 suitably supported on a bracket 29 connected to the side post. By virtue of this arrangement the ends of the deck in the down position are firmly seated on seats 28 and supported on the side post 13.

Referring particularly to FIG. 2 through 5 a spring counterbalancing arrangement 30 comprises a lever 31 having at one end thereof a pivot pin 32 pivotally supported on a bracket 33 connected to one of the channels 23 and having a lost motion connection therewith by virtue of a elongated slot 34 provided in the bracket 33. Between the ends of the lever there is provided a pivot bracket 35 supported on a flanged bracket 49 carried by one of the posts 13 which includes a pivot pin 36 pivotally supporting the lever 31 on the said bracket. The opposite end of the lever 31 is provided with link means including a pivot pin 37 extending through spaced plate or clevis members 38 to which is connected a spring assembly generally designated by the reference character 39.

The spring assembly 39 comprises a tension rod 40 pivotally connected to the bracket 38 and projecting through an opening 50 provided in the flange bracket 49. The upper end of the spring assembly 39 includes a spring plate 42 and a lower retainer plate 43 is supported on the tension rod 40 with the lower end thereof being connected thereto by means of nut 44 threaded onto the end of the tension rod. A bracket 49 is provided with an opening 50 through which the tension rod may slide and the spring plate 42 is suitably slidable on the tension rod 40. A spring guide 45 is supported on the retainer plate 43 and the tension rod 40 extends therethrough. A coil spring 46 is held captive between the plates 42 and 43 providing the biasing means for the assembly. A tubular spring guide 47 is suitably connected by means of a bracket 48 to the post structure 13 for guiding the vertical movement of the spring and spring retainer.

As best shown in FIGS. 2 through 5 a locking arrangement generally designated at 51 comprises a housing 52 which is supported within the channel 23 to the right of the counterbalancing arrangement 30. A lever 53 is rigidly connected to a shaft 54 which is pivotally mounted within the housing 52. The shaft 54 is rigidly connected to a vertically extending latch arm 55 having at its lower end a hooked shaped keeper engaging member 56 extending in one direction and at its upper end another similar keeper engaging member 57 extending in an opposite direction.

As best shown in FIGS. 2 and 3, a lower keeper plate 59 projects outwardly from the channel shaped member 23 and a similar keeper plate 58 is disposed vertically above the keeper member 59 projecting outwardly in the same direction. A spring assembly 60 supported on a bracket 61 urges the lever 53 into keeper engaging positions as will be described.

FIGS. 8 and 9 disclose a modified form of a spring counterbalancing arrangement in that a spring assembly is positioned vertically above the ends of the lever 31 rather than below as shown in FIGS. 2 through 5. The bracket 62 is supported on the post 13 and projects outwardly to one side thereof. The bracket 62 has supported therein spaced plates or clevis members 35 providing a pivot for the lever 31 by means of the pivot pin 36. The spring assembly is designated at 63 and includes a tension rod 64 having at its lower end a clevis 65 in turn pivotally connected by means of pivot pin 66 to the end of the lever 31. The rod 64 has secured thereto a spring stop or retainer 67 and a coil spring 68 is supported on the retainer 67 said spring engaging a flange 70 of a guide bracket 69 suitably supported on an attaching bracket 72 secured to one of the posts 13. The flange 70 includes a flanged guide opening 71 through which the rod 64 is adapted to reciprocate.

THE OPERATION

The loading of vehicles onto the railway car 10 is conventional the same being driven onto the lower floor or platform and onto the upper decks from suitable elevated ramps. During loading of the lower deck or floor it is desired, in order to facilitate the loading of the cars, to raise the hinged decked sections 20 about the hinged members 21 so that the outer ends are raised upwardly. On opposite sides of the car the locking assemblies 51 are provided and the counterbalance arrangements 39 are also provided on each side of the car. In the down position the lever 53 is in the position shown in FIG. 2 wherein the hooked shaped member 56 is in engagement with the keeper 59 preventing upward movement of the deck. The spring 60 is provided to maintain the lever or handle 53 in the locked position. Operators grasp and pivot the lever 53 thus releasing the member 56 from the keeper 59 and the counterbalance spring assembly provides for biasing movement upwardly to assist the operator who is moving the hinged deck into its raised position. The spring assembly 39 continually urges the lever 31 into the raised position since the coil spring 46 is compressed against the bracket 49 thereby urging the tension rod to be moved downwardly. The spring guide 47 serves to maintain the action of the spring in vertical and guided relation.

When the deck 20 has moved to its uppermost position the hooked shaped keeper and engaging member 57 engages the keeper 58 as shown in FIGS. 2 and 5, which is positioned to one side and above the keeper 59. The lowered position with the deck locked is shown in FIG. 2.

The operation of the modification shown in FIGS. 8 and 9 functions substantially the same manner as previously described. The lever arrangement 53 secures the deck 22 in lower or upper positions and the lever 31 is continually urged upwardly so that when the locking mechanism is released the deck is easily raised by means of the counterbalancing arrangement 63. In this arrangement the rod 64 is guided at its upward end by means of the bracket 69 and the spring continually biases downwardly from its seat on flange 70 by virtue of its captive engagement with the spring retainer 67. Thus, the operator may easily raise and lower the deck with the counterbalancing arrangements serving to permit the manual operation to be performed easily and without any particular effort on the part of the operator involved.

What is claimed is:

1. A transportation device for carrying vehicles including a body having a lower vehicle supporting floor,
   a plurality of longitudinally spaced upright side posts connected to said body on opposite side of said floor,
   a deck supported on said side posts in vertically spaced relation above said floor,
   said deck including a vehicle carrying first section rigidly connected to said post,
   a second vehicle carrying section of said deck including hinge means connected to one end of said second section and to said first section whereupon the other end of said second section may be swung upwardly between raised and lowered positions, the improvement of,
   a counterbalancing arrangement for said second deck section including:
   a lever having a first end, a second end and pivot means intermediate said ends on said lever supporting said lever on one of said posts,
   connecting means comprising a lost motion connection for pivotally joining the first end of said lever to the second section of said deck,
   compressively loaded mechanical spring biasing means supported on one of said posts in substantially parallel relation thereto and slightly inwardly thereof and in shielded relation thereby,
   said biasing means including link means pivotally connected to the second end of said lever, bracket means on said one post, and a spring operatively interposed between and connected to said link and bracket means and reactive thereagainst for exerting an upward force on the first end of said lever for raising said second section, and support means on one of said posts for releasably supporting an outer end of said second section in a vehicle supporting position.

2. The invention is accordance with claim 1, and
said lever having a short arm between said pivot means intermediate on said lever and said second end of said lever and a long arm between said intermediate pivot means and said first end of said lever.

3. The invention in connection with claim 1,
said lost motion connection comprising a bracket mounted on said second section having a slot, and
a pin on said lever slidingly engaged in said slot for allowing limited arcing motion of said second rection of said deck.

4. The invention in accordance with claim 3,
said pivot means supporting said lever on said post comprising a bracket positioned substantially adjacent to said means pivotally connecting said lever to said biasing means.

5. The invention in accordance with claim 1,
including means on said second section for locking the same in said vehicle supporting position.

6. The invention in accordance with claim 5,
said biasing means comprising a spring assembly, and
a bracket connecting an upper end of said assembly to one of said posts, and
guide means on said posts for guiding and retaining a lower end of said spring assembly on one of said posts.

7. The invention in accordance with claim 5,
said biasing means comprising a spring assembly including,
a bracket connected to one of said posts,
said link pivotally connecting said biasing means to said lever including a tension rod,
said spring carried by said tension rod,
said spring having its upper end in abutting engagement with said bracket,
a spring retainer connected to the lower end of said rod for retaining said spring,
said tension rod being positioned in moving and guiding relation to said bracket whereby said spring is tensioned against said bracket during the vehicle carrying position of said second section and during the release of said lock returns to a neutral compressed position moving said second section to its raised position.

8. The invention in accordance with claim 7,
including guide means on said post for guiding said spring retainer during movement thereof.

9. The invention in accordance with claim 5,
said biasing means including a rod,
a spring retainer on said rod,
a bracket supported on one of said posts, means slidingly supporting said rod on said bracket,
and said spring captive between said bracket and said retainer continually biasing said lever to raise said second section.

10. The invention in accordance with claim 9,
said spring assembly being supported above said lever and exerting a downward biasing force.

* * * * *